United States Patent Office 3,488,211
Patented Jan. 6, 1970

3,488,211
VAPOR BARRIER POLYOLEFIN FILMS
Edward D. Morrison and Robert F. Williams, Jr., Rochester, N.Y., assignors to Eastman Kodak Company, Rochester, N.Y., a corporation of New Jersey
No Drawing. Filed Aug. 31, 1967, Ser. No. 664,607
Int. Cl. B05c 9/04; B44d 1/09
U.S. Cl. 117—68.5                12 Claims

ABSTRACT OF THE DISCLOSURE

The invention provides an improved heat and/or solvent sealable vapor barrier polyolefin film base having coated on at least one side thereof a layer consisting essentially of a polymer blend comprising from about 60 to about 95 percent of a copolymer consisting essentially from about 50 to about 95 percent of vinylidene chloride and from about 5 to about 50 percent of acrylonitrile, and from about 5 to about 40 percent of a poly(vinyl acetate) resin.

The present invention relates to gas barrier polyolefin base films which can be used as plastic overwrap materials. More particularly, this invention relates to coated polyolefin films which are clear, stiff, and can be heat or solvent sealed, and act as grease, gas, and moisture barriers.

Efforts to provide heat and/or solvent sealable vapor barrier overwrapping films have been numerous and varied. The products of these efforts have ranged from polyolefin coated polyesters to polyolefins coated with vinylidene chloride copolymers, always with the result that at least one and sometimes more than one of the properties such as clarity, stiffness, machinability, heat sealability, solvent sealability and vapor permeability, which are important in overwrapping materials, is lost.

For example, compression rolled polyethylene films are clear, reasonably stiff, and are machinable to some degree; however, conventional polyethylene films do not lend themselves to heat sealing on ordinary conventional type heat sealing packaging machinery, such as has been particularly useful in the case of sealing cellophane. Special techniques have been developed by which packages made from plain polyethylene have been heat sealed. Nonetheless, these special techniques require closer supervision than that needed for conventional overwrapping, and therefore are relatively more expensive and not nearly so widely used as the conventional techniques. Furthermore, polyolefin films may be likened to sieves when their vapor barrier properties are considered. For this reason, such films have proven to be unsuccessful as vapor barrier overwrapping materials. The use of vinylidene chloride copolymer films in thin gauges has also had shortcomings. For example, such films are very difficult to handle on packaging machinery, and have a very narrow range in which a heat seal can be effected. Additionally, they present a static electricity problem in processing. Also, when a vinylidene chloride copolymer film is heat sealed the film shrinks and puckers, thereby spoiling the attractiveness of the package which it is desired to preserve.

Vinyl chloride/vinyl acetate copolymer films (used to a very limited extent in the packaging field) cannot be heat sealed on conventional packaging machinery, and are sealed only with difficulty, for example, by the use of electronic methods, where the films are fused or welded together ultrasonically. Additionally, these films have a relatively low maximum use temperature and unless they are highly plasticized, they are not useful at low temperatures. If they are highly plasticized, they present plasticizer problems with respect to migration, staining, toxicity, etc. Thus, although such films may provide useful gas barriers, they are not suitable for use in food wrapping or other conventional overwrapping applications.

Polyolefin films have previously been coated with copolymer of vinylidene chloride and acrylonitrile to reduce grease, moisture, and gas transmission through the films. The copolymer coatings are effective in improving the barrier properties of the polyolefins, but they fail to correct objectionable properties such as limpness, haze and limited heat sealing capabilities. Films of this type are normally coated only one one side since the vinylidene chloride/acrylonitrile copolymer has heat sealing properties less advantageous than those of the polyolefin upon which they are cast. Thus, in such conventional vapor barrier polyolefin films, it is the polyolefin film base layer which actually serves as the heat sealing portion of the film, and such films possess the same heat seal disadvantages as set forth above for polyolefin films in general.

It is therefore the object of the present invention to provide polyolefin film that is both (a) solvent and/or heat sealable and (b) an excellent vapor barrier, which film, because of its resistance to the transmission of vapors, clarity, relative stiffness, and excellent heat sealing properties, is suitable for use as an overwrapping material and capable of being processed on conventional heat or solvent sealing machinery according to conventional heat or solvent sealing techniques.

According to the present invention there is provided a heat and/or solvent sealable, vapor barrier, polyolefin film comprising a polyolefin film base having coated on at least one side thereof a layer consisting essentially of a polymer blend comprising from about 60 to about 95 percent of a vinylidene chloride/acrylonitrile copolymer (containing from about 50 to about 95 percent of vinylidene chloride and from about 5 to about 50 percent of acrylonitrile) and from about 5 to about 40 percent of a poly(vinyl acetate) resin.

The polyolefin materials which go to make up the polyolefin film base may consist of any of the conventional high or low density polyethylenes, polypropylene, or other olefin copolymers. Specifically preferred in our invention are polymers made from alpha-olefins having 2 to 10 carbon atoms such as ethylene and propylene. Also, in order to eliminate the objectionable haze and limpness of conventional polyolefin films, the above-described polymer blend should be applied to compression rolled polyolefin films which are free of most of these defects and which may be prepared by rolling using lubricants according to copending U.S. application having Ser. No. 565,305 filed July 14, 1966, now abandoned.

In order to achieve a substantial bond between the polyolefin film base and the polymer blend coating which is placed thereon, it has also been found beneficial to treat the surface of the polyolefin film according to any of a number of conventional surface treatment techniques. Satisfactory surface treatment may be accomplished by the well-known electrical discharge techniques, chemical oxidation as for example with sulfuric acid or a chromic acid oxidant, and even conventional flame oxidation techniques. Furthermore, satisfactory surface treatments may also be accomplished by any number of the subbing techniques known to those skilled in the art, and preferably those subbing techniques which utilize the subbing materials disclosed in copending U.S. application Ser. No. 653,924.

The polymer blend which is applied to at least one and preferably both surfaces of the above-described polyolefin films comprises a blend of from about 60 to about 95 percent of a copolymer consisting essentially of from about 50 to about 95 percent of vinylidene chloride and from about 5 to about 50 percent of acrylonitrile, and from about 5 to about 40 percent of a poly(vinyl acetate) resin.

The vinylidene chloride/acrylonitrile copolymers suitable for use in this invention are generally those described in U.S. Patent 2,238,020 to Hanson and Goggin. This patent also provides methods for the preparation of the monomers suitable for preparation of the copolymers for use in the present invention. It is apparently the vinylidene chloride portion of the copolymer which effectively produces the gas barrier property and imparts this property to the coated polyolefin film. However, since vinylidene chloride homopolymers decompose readily with the application of heat at a temperature of about 190° C. to give off HCl and other undesirable products, the acrylonitrile is added to form a copolymer having a lower heat sealing temperature and hence provide a product suitable for use in conventional heat sealing machinery. If the vinylidene chloride concentration in the copolymer exceeds about 95 percent, undesirable decomposition may occur when the finished film is subjected to heat sealing at temperatures from about 150 to 400° F., while a concentration of acrylonitrile in the copolymer in excess of about 50 percent provides an unsuitable vapor barrier film.

According to the preferred embodiment, the copolymer should consist of from about 60 to about 90 percent by weight of vinylidene chloride and from about 10 to about 40 percent by weight of acrylonitrile.

As shown in the examples below, optimum results were achieved when the copolymer contained about 85 percent vinylidene chloride and about 15 percent acrylonitrile.

The poly(vinyl acetate) resins which form the balance of the polymer blend coating are generally those which can be preformed in the liquid phase by the reaction of acetic acid with acetylene in the presence of a mercuric catalyst and a reaction promoter such as boric acid, boron fluoride, methane trisulfonic, or any of the other methods as described in U.S. Patents 2,329,644, 2,021,873 and 2,351,664. Alternatively, the monomer may be prepared, for example, in the vapor phase by the passage of acetylene gas over acetic acid at a temperature of 120° C. to yield a 5 to 1 acetylene to acetic acid vapor mixture which is subsequently heated to 180° C. and passed over zinc acetate catalyst as described in U.S. Patent 1,822,525. Similarly, the same method may be exercised using a different catalyst such as zinc-cadmium-mercury chromite as disclosed in U.S. Patent 2,411,962 or zinc or cadmium silicate as disclosed in U.S. Patent 2,521,113.

Such monomers may be subsequently polymerized according to any conventional vinyl polymerization technique including bulk polymerization in ethyl acetate as disclosed in U.S. Patent 2,122,805. Specifically preferred is a poly(vinyl acetate) resin having an average molecular weight of about 155,000 and an intrinsic viscosity of about 0.68.

The chief function of the poly(vinyl acetate) portion of the polymer blend is to provide a lower heat seal temperature for the coating. As stated above, pure vinylidene chloride polymers heat seat at relatively high temperatures and usually with decomposition. While the acrylonitrile portion of the copolymer serves to lower the heat sealing temperature, such copolymers of vinylidene chloride and acrylonitrile still maintain relatively high heat seal temperatures of about 125° C. and are too close to the melting temperature of the polyolefin film. Thus, the poly(vinyl acetate) resin portion of the polymer blend serves to lower the effective heat seal temperature. Adequate heat seal may be achieved when the poly(vinyl acetate) portion of the polymer blend ranges from about 5 to about 40 percent by weight thereof. A poly(vinyl acetate) concentration of from about 10 to about 30 percent by weight is preferred. Optimum heat sealing is achieved when the heat seal vapor barrier coating consists of about 80 percent of the vinylidene chloride/acrylonitrile copolymer and about 20 percent of the poly(vinyl acetate) resin. If the poly(vinyl acetate) concentration is below about 5 percent, the polymer blend coating has a heat sealing temperature which is too high. If the poly(vinyl acetate) resin concentration becomes too high, i.e., above about 40 percent, the polymer blend coating loses its ability to adhere to the polyolefin film base to a significant degree and hence may separate therefrom during processing of the film. The effectiveness of the coating as a gas barrier is also decreased.

The above-described polymer blend coatings may be applied from suitable solvent systems. Some such solvents include methyl-ethyl ketone, toluene, ketones and aromatics in general, and esters such as ethyl acetate. In order to achieve a coatable dope, the polymer blend should comprise at most about 25 to 30 percent by weight of the coating dope.

The thickness of the layer which is applied may be related to the cost of the finished film. The minimum thickness which may be applied is of course that which provides a minimum acceptable gas or vapor barrier. For example, acceptable maximum vapor transmission rates for three of the most common vapors or gases present in photographic applications are as follows: nitrogen 0.08 cc. per 100 square inches per 24 hours; oxygen 0.20 cc. per 100 square inches per 24 hours; and carbon dioxide 0.75 cc. per 100 square inches per 24 hours. In this application, optimum results have been obtained when about 0.3 pound of the polymer blend has been applied per 1000 square feet of polyolefin film base. The density of polymer blend may however range from about 0.05 pound to about 0.5 pound per 1000 square feet of polyolefin film depending upon the final use to which the film is to be put, and a preferred density range is from about 0.2 to about 0.4 pound of the polymer blend per 1000 square feet of polyolefin film base.

The above-described polymer blend dopes may be applied according to any conventional coating technique. Such techniques include roll coating, dip and doctor blade means.

A further understanding of the invention will be had from a consideration of the following examples that may also be used in actual commercial practice and are set forth merely to illustrate certain preferred embodiments of the invention.

EXAMPLE 1

Polyethylene having a conditioned density of 0.960 gram per cc. and a melt index of 50 is extruded from a 4½ inch modern plastic extruder at a melt temperature of 550° F. onto a take-off roll maintained at an internal temperature of 160° F. The extruded strip produced has a thickness of 5 mils and is 56 inches wide. The strip is compression rolled to 0.9 mil between steel rolls heated to 210° F. and clamped with 14,000 pounds per linear inch pressure and using an aqueous solution of sodium dioctyl sulfosuccinate as a rolling lubricant. The surface of the compression rolled film is treated by an electrical discharge to change the contact angle of the original compression rolled film from 100+ degrees to 63° after treatment.

After the film has been treated as above it is coated with the following dope using a 0.036-inch diameter wire wound rod:

|   | Percent |
|---|---|
| Vinylidene chloride/acrylonitrile copolymer[1] | 9 |
| Poly(vinyl acetate)[2] | 1 |
| Methyl ethyl ketone | 70 |
| Ethyl acetate | 20 |

[1] A commercially available copolymer of 85 percent vinylidene chloride and 15 percent acrylonitrile.
[2] Average molecular weight about 155,000 intrinsic viscosity of 0.68.

After air drying, the film is cured for 5 minutes at 110° C. to leave a polymer blend density of 0.3 pound per 1000 square feet of film base. The film which results is clear and can be heat sealed at 225° F. The film has a gas transmission rate as determined using ASTM Method No. 1438–58 as follows: Gas transmission rate (cc./100 in. sq./24 hours)—$N_2$, .04; $O_2$, .15; $CO_2$, .63.

EXAMPLE 2

A strip that has been extruded, compression rolled, and electronically treated in the same manner as in Example 1 is coated with a dope composed of

| | Percent |
|---|---|
| Vinylidene chloride/acrylonitrile copolymer | 8 |
| Poly(vinyl acetate) | 2 |
| Methylisobutyl ketone | 63 |
| Acetone | 27 |

The clear coating which results has a density of 0.3 pound of coating per 1000 square feet of compression rolled polyethylene and can be readily heat sealed using conventional equipment at 225° F.

EXAMPLE 3

A polyethylene film which has been extruded and compression rolled as in Example 1 is treated by coating a 10 inch wide section of the polyethylene sheet with a 0.5 mil dry thickness layer of a thermally degraded polyethylene having an average molecular weight of between about 2500 and 3000 which has been reacted with maleic anhydride to yield a maleated low density polyethylene having an acid number of 6, the coating being performed from a toluene solution of the maleated low-density polyethylene. The subbed strip is compression rolled to 0.9 mil between 10.5 inch diameter steel rolls heated to 200° F. and clamped with 3000 pounds per linear inch pressure. The subbed and compression rolled polyethylene film is then coated with the following dope using a 0.036 inch diameter wire wound rod:

| | Percent |
|---|---|
| Vinylidene chloride/acrylonitrile copolymer | 9.5 |
| Poly(vinyl acetate) | 0.75 |
| Methylethyl ketone | 70.0 |
| Ethyl acetate | 19.75 |

After air drying, the film is cured for 5 minutes at 110° C. There results a coating of the polymer blend having a density of 0.25 pound per 1000 square feet of polyethylene film base. The film thus produced is clear, can be heat sealed at 225° F. and has a gas transmission rate of less than 0.20 cc. per 100 square inches per 24 hours for nitrogen, oxygen, and carbon dioxide determined using ASTM 1438–58.

EXAMPLE 4

The following table compares a vapor barrier polyolefin film comprising a polyolefin film base having a coating of vinylidene chloride/acrylonitrile copolymer and poly(vinyl acetate) with films having either a coating of only vinylidene chloride/acrylonitrile copolymer or only poly(vinyl acetate). All of the tests were made on compression rolled polyethylene prepared as described in Example 1. The density of the coating in all cases was substantially 0.3 pound per 1000 square feet of polyethylene film base.

| Coating Composition | Gas Transmission, cc./100 in. 2/24 hr. | | | Heat Seal Strength at 225° F., lb./in. |
|---|---|---|---|---|
| | $N_2$ | $O_2$ | $CO_2$ | |
| Vinylidene chloride/acrylonitrile copolymer plus poly(vinyl acetate) (93%/7%) | <.20 | <.20 | <.20 | .23 |
| Vinylidene chloride/acrylonitrile copolymer (100%) | .02 | .30 | .61 | .03 |
| Poly(vinylacetate)(100%) | 846 | 931 | 1,255 | (1) |

[1] Separates from base.

As seen from the above results, the film having a coating containing only vinylidene chloride/acrylonitrile copolymer is an acceptable gas barrier but has an unacceptable heat seal at 225° F. The compression rolled polyethylene film having a coating containing only poly(vinyl acetate) is unacceptable as a gas barrier and also does not adhere satisfactorily to the polyethylene film base. The polyethylene film base having a coating containing a blend of the vinylidene chloride/acrylonitrile copolymer and poly(vinyl acetate) resin forms an acceptable gas barrier and has satisfactory heat seal at 225° F.

The curing of the polymer blend of the polyvinylidene chloride/acrylonitrile copolymer and poly(vinyl acetate) resin may take place under a variety of conditions. The length of time for which the cure lasts depends only upon the amount of time required to evaporate the solvent portion of the dope. Thus, this curing time may range from about 30 seconds up to about 10 minutes, depending upon the nature and boiling point of the solvent which is present and also the conditions of evaporation. The temperature at which curing as carried out is also not critical. A temperature of 110° C. was selected as the curing temperature in the examples since above this temperature the vinylidene chloride/acrylonitrile copolymer portion of the polyethylene coating begins to distort. Thus, 110° C. would seem to be the upper limit for such curing temperatures; however, the lower limit for curing will be established by the nature of the solvent utilized in the dope and the conditions under which curing is carried out.

As should also be clear from the examples, blends of the aforementioned solvents may be used as well as single solvent systems. No realistic limits can be placed on the ranges of the solids content of the polymer blend in a particular solvent system. So long as sufficient amounts of the polymer blend are dissolved to provide the desired thickness of polymer blend coating upon the surface of the compression rolled polyolefin film, the solutions will be satisfactory for use in accordance with this invention.

The invention has been described in detail with particular reference to preferred embodiments thereof, but it will be understood that variations and modifications can be effected within the spirit and scope of the invention as described hereinabove.

We claim:

1. A vapor barrier polyolefin film comprising a polyolefin film base having a cured coating on at least one side thereof of a polymer blend consisting essentially of (a) from about 60 to about 95 percent of a copolymer consisting essentially of from about 50 to about 95 percent vinylidene chloride and from about 5 to about 50 percent acrylonitrile, and (b) from about 5 to about 40 percent poly(vinyl acetate) resin.

2. The vapor barrier polyolefin film of claim 1 wherein said copolymer consists essentially of from about 60 to about 90 percent by weight of vinylidene chloride and from about 10 to about 40 percent by weight of acrylonitrile.

3. The vapor barrier polyolefin film of claim 2 wherein said polymer blend consists essentially of from about 70 to about 90 percent by weight of said copolymer and from about 10 to about 30 percent of said poly(vinyl acetate) resin.

4. The vapor barrier polyolefin film of claim 2 wherein said copolymer consists essentially of about 85 percent by weight of vinylidene chloride and about 15 percent by weight of acrylonitrile.

5. The vapor barrier polyolefin film of claim 4 wherein said polymer blend consists essentially of about 80 percent by weight of said copolymer and about 20 percent by weight of said poly(vinyl acetate) resin.

6. The vapor barrier polyolefin film of claim 3 wherein said polyolefin film base consists essentially of a polyolefin selected from the group consisting of polyethylene and polypropylene.

7. The vapor barrier polyolefin film of claim 6 wherein said polyolefin film base consists of a compression rolled polyolefin film.

8. The vapor barrier polyolefin film of claim 3 wherein said layer of polymer blend ranges in density from about 0.05 to about 0.5 pound per 1,000 square feet of said polyolefin base.

9. The vapor barrier polyolefin film of claim 8 wherein said layer of polymer blend ranges in density from about 0.2 to about 0.4 pound of polymer blend per 1,000 square feet of said polyolefin base.

10. The vapor barrier polyolefin film of claim 9 wherein the density of said layer of polymer blend is about 0.3 pound of polymer blend per 1,000 square feet of said polyolefin film base.

11. The vapor barrier polyolefin film of claim 9 wherein said poly(vinyl acetate) resin consists essentially of a poly(vinyl acetate) having an average molecular weight of about 155,000 and an intrinsic viscosity of 0.68.

12. The vapor barrier polyolefin film of claim 9 wherein said polyofefin film base has a coating of said layer of polymer blend upon both sides thereof.

References Cited

UNITED STATES PATENTS 2,961,342  11/1960  Snyder.
2,968,576  1/1961   Keller.

FOREIGN PATENTS 544,220  7/1957   Canada.
147,753  1/1949   Australia.
258,653  5/1963   Australia.
544,387  7/1957   Canada.
700,482  12/1964  Canada.
699,507  12/1964  Canada.

WILLIAM D. MARTIN, Primary Examiner

J. E. MILLER, Jr., Assistant Examiner

U.S. Cl. X.R.

117—122, 138.8, 161; 260—898

PO-1050
(5/69)

UNITED STATES PATENT OFFICE
CERTIFICATE OF CORRECTION

Patent No. 3,488,211     Dated   January 6, 1970

Inventor(s) Edward D. Morrison and Robert F. Williams Jr.

It is certified that error appears in the above-identified patent and that said Letters Patent are hereby corrected as shown below:

In the Specification

In column 2, line 65, delete "Ser.No. 653,924." and substitute therefor ---Ser.No. 653,924, filed July 17, 1967-

In column 3, line 60 delete "seat" and substitut therefor ---seal---.

In column 5, line 47 delete "les" and substitute therefor ---less---.

SIGNED AND
SEALED
SEP 1 - 1970

(SEAL)
Attest:

Edward M. Fletcher, Jr.
Attesting Officer

WILLIAM E. SCHUYLER, JR.
Commissioner of Patents